United States Patent
Malinowski

(10) Patent No.: US 10,587,110 B2
(45) Date of Patent: Mar. 10, 2020

(54) OVER VOLTAGE PROTECTION SYSTEM AND METHOD

(71) Applicant: Dialog Semiconductor (UK) Limited, London (GB)

(72) Inventor: Slawomir Malinowski, Graz-Seiersberg (AT)

(73) Assignee: Dialog Semiconductor (UK) Limited, London (GB)

( * ) Notice: Subject to any disclaimer, the term of this patent is extended or adjusted under 35 U.S.C. 154(b) by 334 days.

(21) Appl. No.: 15/671,412

(22) Filed: Aug. 8, 2017

(65) Prior Publication Data

US 2019/0020189 A1    Jan. 17, 2019

(30) Foreign Application Priority Data

Jul. 13, 2017    (DE) ........................ 10 2017 212 037

(51) Int. Cl.
| | |
|---|---|
| *H02H 3/06* | (2006.01) |
| *G06F 1/28* | (2006.01) |
| *H02H 9/04* | (2006.01) |
| *H02H 3/20* | (2006.01) |
| *H02H 7/12* | (2006.01) |

(52) U.S. Cl.
CPC ................ *H02H 3/06* (2013.01); *G06F 1/28* (2013.01); *H02H 3/20* (2013.01); *H02H 7/1213* (2013.01); *H02H 9/04* (2013.01)

(58) Field of Classification Search
CPC .......... H02H 3/06; H02H 3/20; H02H 7/1213; H02H 9/04; G06F 1/28
USPC .......................................................... 361/79
See application file for complete search history.

(56) References Cited

U.S. PATENT DOCUMENTS 6,185,082 B1 * 2/2001 Yang ....................... H02M 1/32
                                                                                                                        323/285

FOREIGN PATENT DOCUMENTS

| | | |
|---|---|---|
| DE | 3738503 | 3/1989 |
| DE | 102010001713 | 8/2011 |

OTHER PUBLICATIONS

Machine translation of Bunke et al. German Patent Document DE 3738503 C1 Mar. 2, 1989 (Year: 1989).*
Machine translation of Herbig et al. German Patent Document DE 102010001713 A1 Aug. 11, 2011 (Year: 2011).*
German Office Action, Reference Number: 10 2017 212 037.1, Applicant: Dialog Semiconductor (UK) Limited, dated May 18, 2018, 12 pages, and English language translation, 8 pages.

* cited by examiner

*Primary Examiner* — Kevin J Comber
(74) *Attorney, Agent, or Firm* — Saile Ackerman LLC; Stephen B. Ackerman

(57) ABSTRACT

A dynamic over voltage protection OVP system for limiting an output voltage at an output of a voltage regulation system is described. The dynamic OVP system contains an enabling device and an output voltage limiting device which are communicatively coupled to each other. The enabling device detects a load release at the output of the external voltage regulation system and generates an enable signal based on the detection. The output voltage limiting device receives the enable signal and limits the output voltage based on the enable signal. In this way, the voltage fluctuation at the output of the voltage regulation system is reduced when a subsequent load step occurs e.g. when a load is re-connected to the output of the voltage regulation system.

19 Claims, 2 Drawing Sheets

US 10,587,110 B2

OVER VOLTAGE PROTECTION SYSTEM AND METHOD

TECHNICAL FIELD

The present document relates to over voltage protection OVP systems and methods. In particular, the present document relates to OVP systems and methods for limiting output voltages of regulated voltage sources such as e.g. linear or switching regulators.

BACKGROUND

Voltage regulators may be found in all kind of electronic devices such as e.g. power supply circuits for stabilizing the DC voltages used by the processor, the display, or other components of an electronic device. Two prominent classes of voltage regulators are linear regulators and switching regulators. Linear regulators are based on transistors that operate in their linear region, whereas switching regulators are based on transistors forced to act as an on/off switches. For both classes however, over voltage protection OVP mechanisms may be required to prevent overvoltages at the outputs of the voltage regulators. Overvoltages may be the result of transients occurring when a load is connected or disconnected from the output of the voltage regulator. Overvoltages may cause damage to the voltage regulator and the connected circuitry or unacceptable acoustic noise e.g. in audio applications.

Typically, a static OVP device is coupled to the output of a voltage regulator. FIG. 1 illustrates a regulation system receiving an input voltage VIN and being configured to regulate the output voltage VOUT towards the voltage regulation level. In FIG. 1, a Zener diode is connected between the output of a regulation system and ground. In the exemplary scenario, the Zener diode implements a static OVP device which prevents the output voltage VOUT of the regulation system from exceeding a predetermined threshold value. Traditionally, the static OVP device is always enabled and might influence the transient response of the system leading to decreased efficiency. The threshold value of the static OVP device is set to a fixed value which has to be much higher than the voltage regulation level of the regulation system. If the threshold value of the static OVP is set too low, the regulation operation of the regulation system may be affected. This will not only affect the symmetry of the transient response, but will also lead to a decreased efficiency of the overall system.

In case the load is disconnected from the output of the regulation system, a voltage overshoot may occur which is clamped by the static OVP device. The OVP device will then sink excess current to ground to prevent the regulation system from being damaged. For example, the static OVP device may be implemented as a regulated NMOS device able to sink the excess current from the output of the regulation system. Alternatively, the static OVP device may be implemented as a corresponding PMOS device.

Usually, an output capacitor is connected in parallel to the static OVP device between the output of the regulation system and ground. In audio systems, it is of particular interest to minimize the voltage change across the output capacitor to limit the acoustic noise generation. The higher the voltage change across the output capacitor, the higher the mechanical noise generated by the capacitor. One possible solution to this problem is to increase the capacitance of the output capacitor in order to reduce the voltage change caused by load transients. This solution, however, entails the disadvantage that—due to the increased area of the output capacitor—the audio noise is increased again, thereby offsetting the benefits of the reduced voltage change.

SUMMARY

The present document addresses the above mentioned technical problems. In particular, the present document addresses the technical problem of reducing the voltage fluctuations at the output of a regulated voltage source in case of load transients. According to an aspect, a dynamic over voltage protection OVP system for limiting an output voltage at an output of an external voltage regulation system is presented. The dynamic OVP system comprises an enabling device and an output voltage limiting device. The enabling device is configured to detect a load release at the output of the external voltage regulation system and to generate an enable signal based on the detection. The output voltage limiting device is configured to receive the enable signal and to limit the output voltage based on the enable signal. In this way, a dynamic OVP system is implemented wherein the actual output voltage limiting device is activated/enabled in case the load release is detected and, hence, the external voltage regulation system is inactive. As a result, the voltage change at the output of the voltage regulation system is reduced e.g. in situations when a load is connected to the output of the voltage regulation system or in case the load is enabled, i.e. in case a so-called load step occurs.

Throughout this document, a load release is meant to represent a condition in which almost no output current is drawn from the output of the external voltage regulation system. This condition may be caused (a) because the load is physically disconnected from said output or (b) because the load has stopped drawing a significant amount of current from the output while still being physically connected to the output. The latter case (b) may happen e.g. in a scenario where the load (e.g. an electronic device) is powered down, in a low-power state and/or a battery of the load (e.g. a battery of the electronic device) is fully charged.

For instance, the enabling device may be configured to detect the load release at the output of the external voltage regulation system when a current at the output of the external voltage regulation system is below a current threshold. Said current threshold may be determined in advance and may be chosen close to zero. That is, the enabling device may be configured to detect the load release at the output of the external voltage regulation system when a current at the output of the external voltage regulation system is zero or close to zero. Further, the enabling device may be configured to detect the load release at the output of the external voltage regulation system if no load is connected to the output of the external voltage regulation system.

In a similar way, a load step is meant to represent a condition in which a load is physically connected to the output and drawing a substantial amount of current from said output. Said substantial amount of current may be e.g. larger than said current threshold.

In the following description, reference may be made to loads which are connected and disconnected from the output of the external voltage regulation system. Nevertheless, in view of the above definitions of load releases and load steps, those skilled in the art will appreciate that a connection and a disconnection of a load may also be interpreted and replaced in the sense of "the load is connected and drawing current from the output" and "the load is connected and drawing almost no current from the output", respectively.

Independent of the fact whether the load release is caused by physical disconnection or by inactivity of the load, the enabling device may be configured to detect the load release at the output of the external voltage regulation system if the load release continues for at least a predetermined time interval. For this purpose, the enabling device may be configured to detect the load release at the output of the external voltage regulation system only if the load release continues for at least a predetermined time interval.

The output voltage limiting device may be configured to limit the output voltage in case the enable signal indicates the load release. Specifically, the output voltage limiting device may be configured to limit the output voltage only if the enable signal indicates the load release, and may be configured to not limit the output voltage if no load release is detected e.g. because a load is connected to the output and drawing power therefrom. In addition to the described output voltage limiting device, the dynamic OVP system may comprise a traditional, static OVP device with a static upper voltage limit which is always enabled.

Moreover, the output voltage limiting device may be configured to not influence the output voltage if the output voltage is smaller than an upper voltage limit and to limit the output voltage to the upper voltage limit in case the output voltage attempts to exceed the upper voltage limit. Said upper voltage limit may be equal to or greater than a voltage regulation level of the external voltage regulation system. The output voltage limiting device may be also denoted as a voltage clamp and may comprise any kind of circuit configured to sink current only when the output voltage exceeds the upper voltage limit. The output voltage limiting device may comprise e.g. a linear regulation circuit or a Zener diode with a Zener voltage equal to the upper voltage limit or some other sort of voltage clamp for clamping the output voltage to the upper voltage limit if needed. For this purpose, the output voltage limiting device may be configured to sink a corresponding amount of current from the output to ground. In addition, the output voltage limiting device may comprise a switching unit configured to couple the output voltage limiting device between the output and ground in case the enable signal indicates that no load is connected to the output or to decouple the output voltage limiting device from the output in case the enable signal indicates that a load is connected to the output.

The enabling device may be configured to detect that no load is connected to the output of the external voltage regulation system if no load is connected to said output for at least a predetermined time interval. To be more specific, the enabling device may be configured to detect that no load is connected to the output of the external voltage regulation system only if no load is connected to said output for at least said predetermined time interval. At this, the enabling device may be configured to detect that no load is connected to the output of the external voltage regulation system based on the output voltage or an output current at the output of the external voltage regulation system, or based on an operating mode of the external voltage regulation system. In order to determine the operating mode of the external voltage regulation system, control signals within the external voltage regulation system may be used by the enabling device to detect the presence/absence of a load. For example, the enabling device may be configured to compare the output voltage against an overvoltage detection threshold and detect that no load is connected to the output in case the output voltage continuously exceeds the overvoltage detection threshold for the duration of the predetermined time interval, i.e. in case the overvoltage condition persists for the predetermined time interval. Said overvoltage detection threshold may be chosen to be equal to or larger than the voltage regulation level of the external voltage regulation system.

As an advantage of observing the no-load-condition for the pre-determined time interval, false detection of a no-load-condition due to noise may be prevented and, in comparison to static OVP systems, the upper voltage limit of the output limiting device may be very close to or even equal to the voltage regulation level of the external voltage regulation system. Thus, in case a subsequent load step causes a voltage droop (or voltage drop), the voltage change at the output of the external voltage regulation system is substantially reduced since the output voltage starts falling from the upper voltage limit which may be chosen to be substantially lower than the static upper voltage limit of a static OVP device which is always enabled. As a further advantage, the output voltage step for power supply rejection ratio PSRR purposes is reduced. Further, an output capacitor coupled to the output of the external voltage regulation system will undergo a smaller voltage change and generate less acoustic noise. This is in particular useful for audio applications.

For example, the enabling device may comprise a timer which is triggered as soon as a load is disconnected from said output (i.e. when the load release occurs) and which expires after said predetermined time interval, thereby triggering the enable signal. It should be mentioned that the enabling device may only trigger the enable signal if—during the entire predetermined time interval—the enabling device detects that no load is connected to the output e.g. by comparing the output voltage against said overvoltage detection threshold. As already described in the foregoing, this continuous observation of the output during the predetermined time interval allows the setting of the upper voltage limit arbitrarily close to the voltage regulation level and thereby avoids influencing the normal operation of the external voltage regulation system.

The output voltage limiting device may be configured to adjust the upper voltage limit. Specifically, the output voltage limiting device may be configured to adjust the upper voltage limit based on the enable signal. Even more specifically, the output voltage limiting device may be configured to decrease the upper voltage limit in case the enable signal indicates that no load is connected to the output. This may happen e.g. after a load release. The decreased upper voltage limit may be chosen to be closer to the voltage regulation level of the external voltage regulation system than the non-decreased upper voltage limit. The other way round, the output voltage limiting device may be configured to increase the upper voltage limit in case the enable signal indicates that a load is connected to the output. This may happen e.g. after a load step. The increased upper voltage limit may be further afar from the voltage regulation level of the external voltage regulation system than the non-increased upper voltage limit. Thus, on the one hand, by dynamically adjusting the upper voltage limit based on the load condition, the dynamic OVP system may behave just as a traditional, static OVP when the voltage regulation system is under load and the upper voltage limit of the output voltage limiting device may be chosen equal to the static upper voltage limit of a static OVP device. On the other hand, the dynamic OVP system may benefit from a decreased upper voltage limit when the voltage regulation system is inactive. In this way, a dynamic OVP system with an adjustable upper voltage limit may make an additional static OVP system dispensable.

According to another aspect, a voltage regulation system is presented. The voltage regulation system is configured to regulate an output voltage at an output of the voltage regulation system to a voltage regulation level. The voltage regulation system comprises a dynamic OVP system as described in the foregoing description, wherein the dynamic OVP system is connected to the output of the voltage regulation system.

The voltage regulation system may comprise a linear regulator or a switching regulator. Additionally, the voltage regulation system may comprise a series resistor connected to its output and connectable to a potential, external load. The series resistor may enable a voltage droop, i.e. an intentional loss in output voltage at the output of the voltage regulation system to increase the system's robustness with regard to load transients.

The voltage regulation system may be configured to regulate the output voltage towards the voltage regulation level only if a present voltage value of the output voltage is smaller than the voltage regulation level. In other words, the voltage regulation system may be said to have a voltage push capability such as e.g. a power converter of the boost type. If the output voltage experiences an overvoltage e.g. due to an load transient, the regulation loop of the voltage regulation system may not become active if the overvoltage exceeds the voltage regulation level.

The voltage regulation system may comprise an output capacitor connected between the output and a reference terminal. The output voltage limiting device may be connected between the output and the reference terminal, too. The reference terminal may be e.g. ground. Throughout this document, the terms "reference terminal" and "ground" are meant in their broadest possible sense. In particular, ground is not limited to a reference point with a direct physical connection to earth. Rather, the term "ground" may refer to any reference point to which and from which electrical currents may flow or from which voltages may be measured.

According to yet another aspect, a dynamic over voltage protection OVP method for limiting an output voltage at an output of a voltage regulation system is presented.

The dynamic OVP method comprises detecting a load release at the output of the voltage regulation system and limiting the output voltage based on the detection. The detecting may comprise detecting the load release at the output only if the load release continues for at least a predetermined time interval. More particularly, the detecting may comprise triggering a timer as soon as a load is disconnected from said output or as soon as the load stops drawing a substantial amount of current from said output, wherein said timer expires after said predetermined time interval. The step of limiting the output voltage may comprise limiting the output voltage in case the load release is detected at the output of the external voltage regulation system. Moreover, the step of limiting the output voltage may further comprise not influencing the output voltage if the output voltage is smaller than an upper voltage limit and limiting the output voltage to the upper voltage limit in case the output voltage attempts to exceed the upper voltage limit. The upper voltage limit may be equal to or greater than a voltage regulation level of the external voltage regulation system. As already explained in the above description, the application of the predetermined time interval and the continuous verification of the no-load-condition during said time interval allows adjusting the upper voltage limit to be slightly above the voltage regulation level, and, hence, a reduction of the voltage change at the output of the voltage regulation system in case of a subsequent load step. As a further technical improvement, the upper voltage limit may be adjusted in case the load release or a load step is detected at the output of the voltage regulation system.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 2:
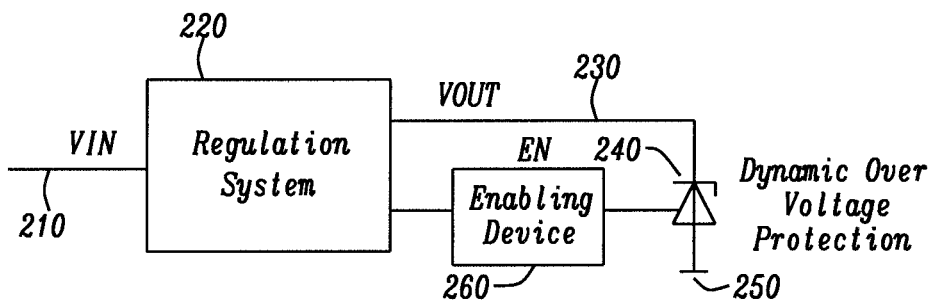
FIG. 2 shows a block diagram of a regulation system with a dynamic OVP system.

As outlined above, the present document relates to a dynamic over voltage protection OVP system and method. FIG. 2 illustrates a block diagram of an example for such an OVP system which is connected to a regulation system 220. Regulation system 220 may comprise e.g. a linear regulator or a switching regulator for controlling the voltage VOUT 230 at its output. In particular, the output voltage VOUT 230 is regulated—independent of the input voltage VIN 210— towards a voltage regulation level. As will be discussed in more detail below, the regulation system may only become active whenever the output voltage VOUT drops below said voltage regulation level.

The exemplary dynamic OVP system comprises an enabling device 260 which is connected to the regulation system 220 and configured to detect that no load is connected to the output of the regulation system 220 and to generate an enable signal based on the detection. For example, enabling device 260 may be connected to the output voltage VOUT 230 to measure and compare the latter with an overvoltage detection threshold. The overvoltage detection threshold may be set larger than the voltage regulation threshold of the regulation system 220. Whenever the output voltage VOUT exceeds said overvoltage detection threshold, this may be used as an indication that an overshoot of the output voltage has occurred. This may be the case e.g. after the load has been removed from the output of the regulation system 220.

Further, the exemplary dynamic OVP system comprises an output voltage limiting device 240 which is connected between the output of regulation system 220 and ground 250. Output voltage limiting device 240 is configured to receive the enable signal generated by the enabling device 260 and to limit the output voltage based on the enable signal. In particular, the enabling device 260 is configured to detect that no load is connected to the output of the regulation system 220 if no load is connected to said output for at least a predetermined time interval. For this purpose, the enabling device 260 may comprise a timer which is triggered as soon as the load is disconnected from said output and which expires after said predetermined time interval, thereby triggering the enable signal. The output voltage limiting device 240 is then configured to limit the output voltage in case the enable signal indicates that no load is connected to the output of the regulation system 220.

The advantages of the proposed dynamic OVP system and methods become evident when analysing voltages, currents and signals within the regulation system 220 and the dynamic OVP system in response to a load release and different load steps at the output of the regulation system 220. To be more specific, FIG. 3 displays the output voltage 300 of the regulation system 220 as a solid line in case a load step occurs at time 314; the output voltage 300a of the regulation system 220 as a dashed line in case an early load step occurs at time 311; the load current 301 drawn from regulation system 220 as a solid line in case the load step occurs at time 314; the load current 301a drawn from regulation system 220 as a dashed line in case an early load step occurs at time 311; signal line 302 indicating times during which enabling device 260 detects that no load is connected to the output of regulation system 220 for the case that the load step occurs at time 314; timer signal 303 illustrating the expiration of the timer at the end of the predetermined time interval; and the enable signal 304 generated by the enabling device 260 for the case that the load step occurs at time 314.

At time 310, a load release is detected by enabling device 260. In case of a load release, the regulation system 220 may saturate. In low drop out circuits, LDOs, the pass device may get switched off. In a DC-DC converter system, the system would be running with minimum on-time Ton or enter the PFM/SKIP mode. Therefore, the enabling device 260 may be configured to detect such a saturation of the regulation system 220 for deciding whether a load has been disconnected from the output of the regulation system 220. Alternatively or additionally, the enabling device may be configured to detect a no-load-condition based on a measurement or a comparison of the output voltage or an output current of the regulation system 220.

As described in the forgoing description, the detection of said load release triggers a timer of the dynamic OVP system. Said timer will expire after a predetermined time interval. If the no-load-condition continues until the expiration of the timer, the expiration of the timer will trigger the enable signal 304 to change its value, which in turn instructs the output voltage limiting device 240 to become active. In response to said load release the output voltage 300 is increasing, resulting in a voltage overshoot. Said voltage overshoot may be e.g. limited by a static OVP device such as e.g. the Zener diode illustrated in FIG. 1.

At time 311, a hypothetical load step occurs before the end of the predetermined time interval. In reaction to this load step, the regulation system 220 may start controlling the output voltage 300a. In LDOs, the pass device may get turned on, in DC-DC converters switching with duty cycles higher than the minimum on-time Ton may occur. Again, the enabling device 260 may be configured to detect the activation of the regulation system 220 for deciding whether a load has been connected to the output of the regulation system 220. Alternatively or additionally, the enabling device may be configured to detect a load at the output based on a measurement or a comparison of the output voltage or an output current of the regulation system 220.

Figure 1:
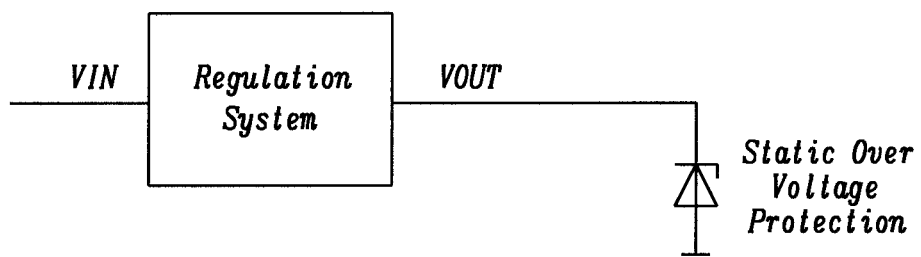
FIG. 1 shows a block diagram of a regulation system with a static OVP device.

In this example, the output voltage 300a crosses the voltage regulation level of regulation system 220 shortly before the end of the predetermined time interval and output voltage 300a drops from the voltage overshoot (which may be e.g. limited by the static OVP device depicted in FIG. 1) to a minimum voltage at time 313 before the regulation system 220 stabilizes and regulates output voltage 300a towards the voltage regulation level. This scenario corresponds to a traditional case in which the static OVP device illustrated in FIG. 1 and described in the background section is used since the output voltage limiting device 240 of the dynamic OVP system is not activated/enabled. The overall voltage change of the output voltage amounts to the voltage overshoot plus the voltage droop (or voltage drop) between the voltage regulation level of the regulation system 220 and the minimum voltage at time 313.

Figure 3:
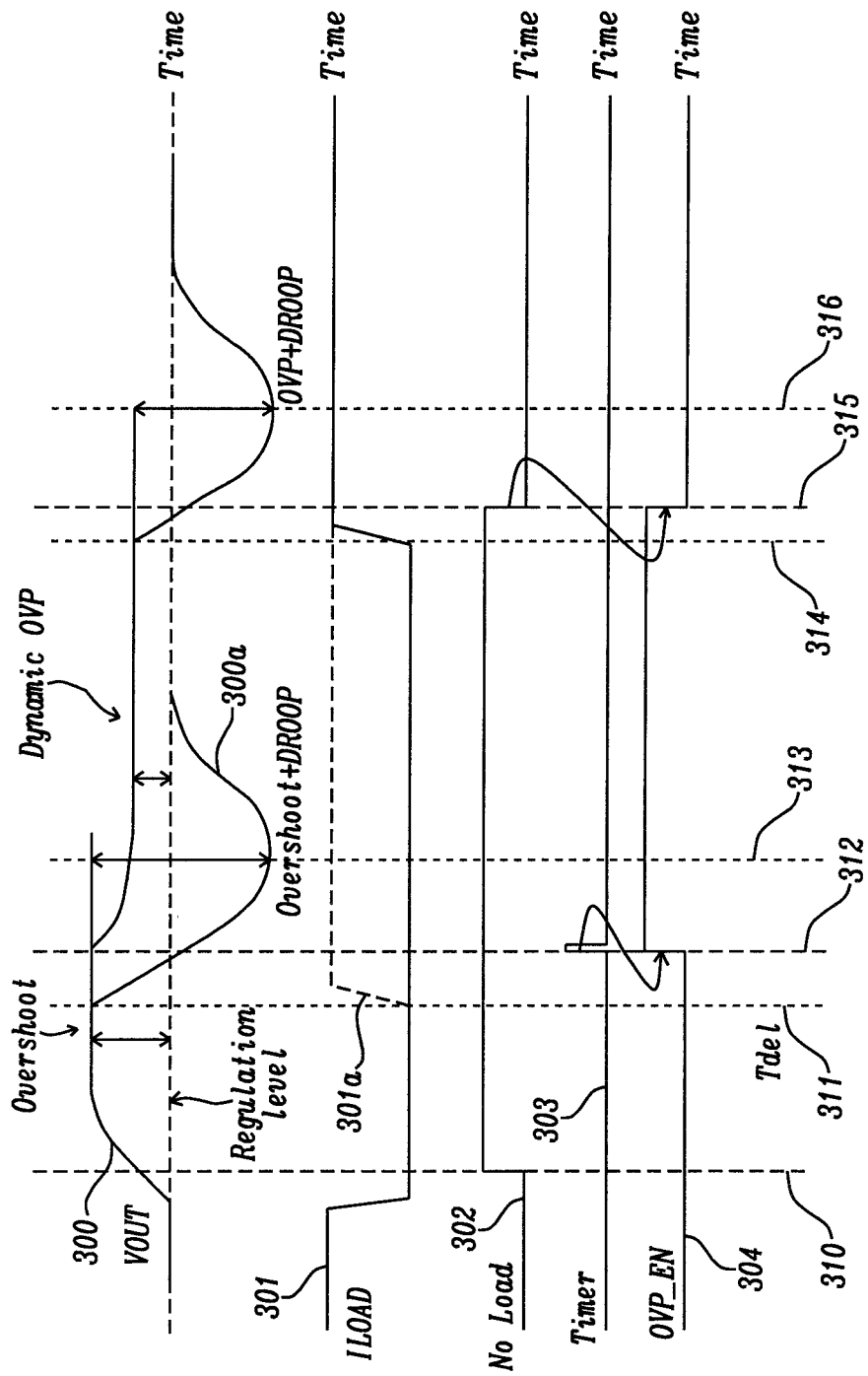
FIG. 3 shows voltages, currents and signals within a regulation system and a dynamic OVP system.

An alternative scenario is also depicted in FIG. 3, wherein the load step occurs after the end of the predetermined time interval at time 314. In this scenario, the timer expires at time 312 and triggers the enable signal 304 immediately. As a result, the output voltage limiting device 240 of the exemplary dynamic OVP system becomes active and limits the output voltage 300 to an upper voltage limit which is significantly below the voltage overshoot during the predetermined time interval. The upper voltage limit may be chosen e.g. slightly above the regulation level to not cause the regulation system 220 to enter the regulation again. When the load step occurs at time 314, the overall voltage change of the output voltage amounts to the upper voltage limit of the output voltage limiting device plus the voltage droop (or voltage drop) between the voltage regulation level of the regulation system 220 and the minimum voltage at time 316. In this regard, it should be mentioned that the minimum voltage at time 313 is equal to or close to the minimum voltage at time 316.

Thus, the voltage change (also denoted as peak to peak transition) of the output voltage is substantially reduced for the dynamic OVP system compared to static OVP systems which would cause a voltage change similar to the one occurring after the hypothetical load step at time 311.

At time 315, the enabling device 260 detects the presence of a load and disables the enable signal 304.

In conclusion, the proposed circuit uses the actual state of the system to detect if the overvoltage protection should be dynamically activated or not. Thus, it becomes possible to limit the output voltage in no-load conditions to minimize the voltage change in case of a load step, without affecting the normal transient response and operation of the regulation system when a load is connected.

Finally, those skilled in the art will readily understand that the proposed dynamic OVP system may be implemented in addition to a traditional, static OVP system. As an alternative, only a dynamic OVP system without any static protection may be used. As a third alternative, a combination of a static and a dynamic OVP system may be replaced by a single dynamic OVP system with an adjustable upper voltage limit. Put in a different way, the upper voltage limit of the output voltage limiting device may be adjusted e.g. based on signal line 302, timer signal 303, or enable signal 304 illustrated in FIG. 3.

It should be noted that the description and drawings merely illustrate the principles of the proposed methods and systems. Those skilled in the art will be able to implement various arrangements that, although not explicitly described or shown herein, embody the principles of the invention and are included within its spirit and scope.

Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A dynamic over voltage protection OVP system for limiting an output voltage at an output of an external voltage regulation system, the dynamic OVP system comprising
   an enabling device configured to detect a load release at the output of the external voltage regulation system and to generate an enable signal based on the detection; and
   an output voltage limiting device configured to receive the enable signal and to limit the output voltage based on the enable signal;
      wherein the output voltage limiting device is configured to not influence the output voltage if the output voltage is smaller than an upper voltage limit and to limit the output voltage to the upper voltage limit in case the output voltage attempts to exceed the upper voltage limit,
      and wherein the output voltage limiting device is configured to increase the upper voltage limit when the enable signal indicates a load step.

2. The dynamic OVP system of claim 1, wherein the enabling device is configured to detect the load release at the output of the external voltage regulation system when a current at the output of the external voltage regulation system is below a current threshold.

3. The dynamic OVP system of claim 1, wherein the enabling device is configured to detect the load release at the output of the external voltage regulation system when a current at the output of the external voltage regulation system is zero or close to zero.

4. The dynamic OVP system of claim 1, wherein the enabling device is configured to detect the load release at the output of the external voltage regulation system if no load is connected to the output of the external voltage regulation system.

5. The dynamic OVP system of claim 1, wherein the enabling device is configured to detect the load release at the output of the external voltage regulation system if the load release continues for at least a predetermined time interval.

6. The dynamic OVP system of claim 1, wherein the enabling device comprises a timer which is triggered as soon as a load is disconnected from said output and which expires after said predetermined time interval, thereby triggering the enable signal.

7. The dynamic OVP system of claim 1, wherein the enabling device is configured to detect the load release at the output of the external voltage regulation system based on the output voltage or an output current at the output of the external voltage regulation system.

8. The dynamic OVP system of claim 1, wherein the output voltage limiting device is configured to limit the output voltage in case the enable signal indicates the load release at the output of the external voltage regulation system.

9. The dynamic OVP system of claim 1, wherein the upper voltage limit is equal to or greater than a voltage regulation level of the external voltage regulation system.

10. The dynamic OVP system of claim 1, wherein the output voltage limiting device is configured to decrease the upper voltage limit in case the enable signal indicates the load release.

11. A voltage regulation system configured to regulate an output voltage at an output of the voltage regulation system to a voltage regulation level, the voltage regulation system comprising a dynamic OVP system according to claim 1.

12. A voltage regulation system according to claim 11, wherein the voltage regulation system is configured to regulate the output voltage towards the voltage regulation level only if a present voltage value of the output voltage is smaller than the voltage regulation level.

13. The voltage regulation system according to claim 11 further comprising an output capacitor connected between the output and a reference terminal.

14. The voltage regulation system according to claim 11, wherein the output voltage limiting device is connected between the output and a reference terminal.

15. A dynamic over voltage protection OVP method for limiting an output voltage at an output of a voltage regulation system, the dynamic OVP method comprising
   detecting a load release at the output of the voltage regulation system; and
   limiting the output voltage based on the detection;
      wherein the limiting comprises
      not influencing the output voltage if the output voltage is smaller than an upper voltage limit; and
      limiting the output voltage to the upper voltage limit in case the output voltage attempts to exceed the upper voltage limit;
      wherein the method further comprises
      increasing the upper voltage limit when a load step is detected at the output of the voltage regulation system.

16. The dynamic OVP method of claim 1, wherein the detecting comprises detecting the load release only if the load release continues for at least a predetermined time interval.

17. The dynamic OVP method of claim 1, wherein the detecting comprises triggering a timer as soon as a load is disconnected from said output, wherein said timer expires after said predetermined time interval.

18. The dynamic OVP method of claim 1, wherein the limiting comprises limiting the output voltage in case the load release is detected at the output of the external voltage regulation system.

19. The dynamic OVP method of claim 15, wherein the upper voltage limit is equal to or greater than a voltage regulation level of the external voltage regulation system.

* * * * *